United States Patent Office 3,804,916
Patented Apr. 16, 1974

3,804,916
SELECTIVE HYDROGENATION OF ALKYNES OR 1,3-CONJUGATED DIENES
Jean-Marc Lalancette, Sherbrooke, Quebec, Canada, assignor to Ventron Corporation, Beverly, Mass.
No Drawing. Filed Mar. 27, 1973, Ser. No. 345,467
Int. Cl. C07c 7/02
U.S. Cl. 260—677 H    6 Claims

ABSTRACT OF THE DISCLOSURE

An improved process is provided for the selective reduction of alkynes or 1,3-conjugated dienes in admixture with alkenes whereby the alkynes or 1,3-conjugated dienes are substantially selectively reduced to the corresponding alkenes without undue reduction of the alkenes to the alkanes. The improvement comprises carrying out the reduction in the presence of a transition metal catalyst intercalated in graphite wherein the transition metal is in the metallic state having a zero valence. The transition metal is selected from nickel, palladium and platinum.

The present invention relates to the treatment of a mixture of alkene and alkynes or conjugated dienes whereby the alkynes and conjugated dienes are substantially selectively reduced to alkenes thereby increasing the alkene content and purifying the initial mixture.

BACKGROUND OF THE INVENTION

The industrial production of olefins is normally accompanied by the formation of small amounts of alkynes or conjugated dienes which must be either eliminated, reduced or converted to alkenes so that the alkenes can be used as starting compounds in chemical synthesis. The alkene mixture may initially be obtained by the pyrolysis of saturated hydrocarbons which are first obtained as one of the petroleum fractions. In normal pyrolytic reaction there is obtained a mixture of a highly desirable alkenes contaminated with undesirable alkynes or conjugated dienes. For example it is known that the preparation of propylene is usually accompanied by the formation of small amounts of methylacetylene or 1,3-butadiene. It is also known that industrial gases such as ethylene, cyclohexene, and other basic hydrocarbons used in industrial organic synthesis are prepared by thermal or catalytic operations that are not exclusive in terms of the reaction product obtained and thus small amounts of corresponding alkynes or conjugated dienes will be found as contaminants. Unless the contaminants are removed or unless the percentage of contaminant is reduced to acceptable levels these alkenes when used in the production of industrial products will also produce corresponding by-products which are required to be removed by elaborate techniques.

Amongst the techniques used to reduce the alkynes or conjugated dienes associated as contaminants with alkenes there may be mentioned the reduction of the mixture with hydrogen in the presence of a catalyst made up of finely divided palladium partially poisoned with sulfur and quinoline or carrying out the reduction by means of sodium in liquid ammonia. It has been found that though these processes will effectively reduce alkynes or conjugated dienes, some of the alkenes will be saturated to alkanes thus decreasing the value of the mixture for industrial purposes and in some cases decreasing the yield of the desired industrial products.

Accordingly it would appear desirable to provide a process wherein an alkene contaminated with an alkyne or a 1,3-conjugated diene can be enriched in alkene though the selective reduction of the alkyne or 1,3-conjugated diene to alkene whereby the end product obtained will be suitable for use in industrial processes for the preparation of alcohols, halogenated products, sulfonation processes, or polymerization or the like.

THE INVENTION

In accordance with the present invention, it has now been found that an alkyne or a 1,3-conjugated diene present as a contaminant in a mixture with an alkene can be substantially selectively reduced to the alkene without unduly affecting the double bond of the alkene. The selective reduction step is carried out with hydrogen in the presence of a transition metal catalyst intercalated in graphite wherein the transition metal is in the metallic state having a zero valence, the metal being selected from nickel, palladium or platinum.

The novel process of the present invention can be applied to mixtures of alkenes with alkynes or 1,3-conjugated dienes in either a batch or continuous process. When the alkene-alkyne or alkene-1,3-conjugated diene is in liquid form, the selective reductive can be carried out in a stand- and hydrogenation apparatus at room temperature and under atmospheric pressure, in which case the transition metal catalyst intercalated in graphite is provided in the form of a suspension in a liquid such as decalin or pentane.

When the alkene-alkyne or alkene-1,3-conjugated diene is in the form of a gaseous mixture, the reduction is carried out in a continuous process by causing a mixture of the gaseous hydrocarbons and hydrogen to circulate over the metal catalyst intercalated in graphite. Preferably the catalyst is supported on a glass wool such as one available on the market under the trademark Vycor. The selective reduction of the alkyne or 1,3-conjugated diene in the mixture is carried out at a temperature between the range of from room temperature to about 350° C. a pressure of from 14 to 300 p.s.i.a. while adjusting the flow rate at from 100 to 20,000 VgVc$^{-1}$ hr.$^{-1}$. It is obvious to one skilled in the art that variations of the three factors outside of the ranges given can be used, the ranges being given to illustrate practical operating ranges with usual hydrogenating equipments.

The alkene-alkyne or alkene-1,3-conjugated dienes which can be traced in accordance with the present invention are those hydrocarbons usually having from 2 to 24 carbon atoms. The mixtures which are usually but not exclusively used are those wherein the alkene and alkyne or 1,3-conjugated diene have the same number of carbon atoms, the alkene may be a straight or a branched chain or cyclic while the alkyne or the 1,3-conjugated diene may be either a straight chain or cyclic hydrocarbon. As an example of suitable mixtures there may be mentioned hexene-hexyne, octenecyclohexylacetylene, cyclooctene-1,3-cyclooctadiene or propyne-propylene, ethylene-acetylene and the like. Also in these mixtures, the alkene is usually in a proportion of at least 80%.

After the reduction is terminated, it is found that in many cases the alkyne has been completely selectively reduced to alkene with little or no formation of alkane. In cases where the alkyne in the mixture is a cyclic hydrocarbon, the reduced product will contain a major amount of alkene with a minor amount of cycloalkane while in other cases when using mixture containing an alkene and and a complex cyclic alkyne such as cyclohexylacetylene, a complex mixture of alkene, alkane, cycloalkane, cyclohexylacetylene and cycloalkene in various proportions but wherein the mixture is enriched in alkene with regard to the other component obtained.

The metal catalyst intercalated in graphite may be prepared as follows. A mixture of graphite and the selected transition metal chloride is heated at about 340° C. for about eight days in the presence of a slow stream of chlorine. After this period an X-ray diffraction pattern analysis will not show peaks for the metal chloride such as platinum, palladium or nickel chloride while the characteristic graphite peak at 3.35 A. is substantially decreased and the appearance of broad bands is observed thus indicating a widening of the graphite lattice through the intercalation therein of the selected transition metal chloride. The latter is then reduced to the metallic state by reduction at −50° C. with biphenyl lithium or an alkali aromatic derivative such as sodium or potassium naphthyl or sodium phenyl in tetrahydrofuran under any inert atmosphere. After allowing the graphite to be in contact with the reducing agent, methanol is added slowly followed by the addition of water. The solid residue is then washed with tetrahydrofuran, water and acetone. After drying for 24 hours under vacuum at 140° C. the graphite is analyzed for transition metal by a spectrophotometric method described in Analytical Abstract 19, 1312 and the selected metal is detected quantitatively.

In accordance with this method a selected metal catalyst intercalated in graphite can be prepared in a concentration varying from 0.01% to about 30% or higher by weight. For the selective reduction process of the present invention the concentrations of the metal intercalated in graphite vary between the range of from 0.1 to 4% by weight when using platinum or palladium and when nickel is used higher concentration may be used. It is obvious that the selected amount is conditioned on the cost of the metal and its specific selectivity when intercalated.

EXAMPLE 1

A mixture of 819.1 mg. of PdCl$_2$ and 9.0 g. of graphite was heated at 340° C. for 8 days, in the presence of a slow stream of chlorine. After this period, the X-ray diffraction pattern is no longer showing the peaks of PdCl$_2$ or PdCl$_4$, the graphite peak at 3.35 A. is decreased and broad bands appear indicating a widening of the graphite lattice. The intercalated salt is then reduced to the metallic state by reduction at −50° with 5.0 g. of biphenyl lithium or an alkali metal aromatic derivative in 150 ml. of THF under helium atmosphere. After a contact overnight with the reducing agent, methanol (60 ml.) is added slowly (2 hrs.) followed by water (60 ml.). The solid material is then washed with THF, water and acetone. After drying for 24 hrs. under vacuum at 140°, this material is analyzed for Pd by the spectrophotometric method described in Analytical Abstract 19, 1312 and found to contain 2.3% of Pd.

Using the amounts of chlorides given in Table I there is obtained catalysts of various metals and intercalated in graphite at various concentrations.

TABLE I

| Chloride | Amount used, g. | | Percent metal intercalated in graphite |
|---|---|---|---|
| | Chloride | Graphite | |
| PdCl$_2$ | 0.0370 | 10 | 0.20 |
| PtCl$_4$ | 0.390 | 10 | 2.3 |
| PtCl$_4$ | 0.200 | 10 | 1.2 |
| NiCl$_2$ | 8.50 | 100 | 3.50 |
| PdCl$_2$ | 0.0280 | 10 | 0.14 |
| PtCl$_4$ | 0.690 | 10 | 4.0 |

EXAMPLE 2

In a standard hydrogenation apparatus operating at atmospheric pressure and room temperature were introduced 2 ml. of a liquid mixture made up of 80% of 1-hexene and 20% of 1-hexyne; 0.100 gram of catalyst made up of 2.3% palladium intercalated in graphite suspended in 10 ml. of Decalin was stirred mechanically for a period of 65 minutes while 130 ml. of dry hydrogen was used up for reduction. The reaction mixture was analyzed by vapor-phase-chromatography on a Carbowax® 20M column.

The same experiment was repeated except that the catalyst was made up of 2.3% palladium on charcoal. Comparative results are reported in Table II.

TABLE II

| | With Pd | |
|---|---|---|
| | Intercalated in graphite, percent | Deposited on charcoal, percent |
| 1-hexene | 99.9+ | 96.6 |
| 1-hexyne | N.D. | 1.0 |
| Hexane | [1] N.D. | 2.4 |

[1] Not detectable.

Observations: With the metal intercalated catalyst the reduction of the triple bond is essentially complete while with the metal deposited on charcoal some alkyne remain unreduced and some olefin is reduced to the alkane stage.

EXAMPLE 3

Following the procedure outlined in Example 2 and reducing at 30° C. a mixture of 80% 1-octene and 20% cyclohexylacetylene with a 2.3% palladium intercalated in graphite suspended in pentane for a period of 30 minutes, the same procedure was repeated with a catalyst made up of 2.3% palladium on charcoal and the results reported in Table III were noted.

TABLE III

| | With Pd | |
|---|---|---|
| | Intercalated in graphite, percent | Deposited on charcoal, percent |
| 1-octene | 76 | 72.8 |
| 1-octane | 4 | 7.2 |
| Cyclohexylacetylene | 4.9 | 8.0 |
| Cyclohexylethylene | 15.0 | 7.9 |
| Cyclohexylethane | 0.1 | 4.1 |

Observations: With the catalyst deposited on charcoal, there is less octene and more octane produced. Also, the removal of the alkyne is almost twice more efficient with the intercalated catalyst. The production of saturated cyclohexylethane is forty times higher with the deposited catalyst than the intercalated catalyst.

EXAMPLE 4

Using the procedure outlined in Example 2 and reducing at 27° C. a mixture of 80% cyclooctene and 1,3-cyclooctadiene with a 1.2% palladium catalyst intercalated in graphite and suspended in Decalin the reduction being done for a period of 58 minutes and repeating the same procedure with a catalyst made up of 1.2% palladium on charcoal, the results reported in Table IV were noted.

TABLE IV

| | With Pd | |
|---|---|---|
| | Intercalated in graphite, percent | Deposited on charcoal, percent |
| Cyclooctene | 95.5 | 93.5 |
| Cyclooctane | 4.5 | 6.5 |
| 1,3-cyclooctadiene | N.D. | N.D. |

Observations: Here, the secondary production of saturated alkane is much less important with the intercalated catalyst.

EXAMPLE 5

Using the procedure outlined in Example 2 and reducing a mixture of 80% 1-hexene and 20% 1-hexyne in the presence of a 4.0% platinum catalyst intercalated in graphite and suspended in Decalin, the reaction being carried out in Decalin and repeating the same procedure with a catalyst made up of 4.0% platinum or charcoal, the results reported in Table IV were noted.

TABLE V

|  | With Pt | |
| --- | --- | --- |
|  | Intercalated in graphite, percent | Deposited on charcoal, percent |
| 1-hexene | 99.9 | 95.2 |
| 1-hexyne | N.D. | 0.8 |
| Hexane | N.D. | 4.0 |

Observations: Here, the secondary production of saturated alkane is much less important with the intercalated catalyst.

EXAMPLE 6

In a steel tube ¼ inch in diameter and 12 inches long was placed 3.50 gr. of 0.14% palladium catalyst intercalated in graphite on Vycor® glass wool. 220 ml./min. (6000 VgVc$^{-1}$ hr.$^{-1}$) of a gas mixture of 70% propylene. 10% propyne and 20% hydrogen was circulated at room temperature and under a pressure of 10 p.s.i. for a period of 25 minutes. In a similar experiment a catalyst of 0.14% palladium on charcoal with Vycor® glass wool support was used. Comparative results are reported in Table VI.

TABLE VI

|  | With Pd | |
| --- | --- | --- |
|  | Intercalated in graphite, percent | Deposited on charcoal, percent |
| Propylene | 98.1 | 96.7 |
| Propyne | N.D. | N.D. |
| Propane | 1.9 | 3.3 |

Observations: There is a major improvement in the selectivity with the intercalated catalyst, the deposited catalyst leading in the amount of propane obtained.

EXAMPLE 7

Using the procedure described in Example 6, the same gas mixture was passed over a catalyst of 0.50% nickel intercalated in graphite and deposited on Vycor® glass wool support at a temperature of 320° C. and a pressure of 43 p.s.i. 920 ml./min. (20,000 VgVc$^{-1}$ hr.$^{-1}$) was used. In a similar experiment a catalyst of 0.5% nickel deposited on charcoal on Vycor® glass wool was used. Comparative results are reported in Table VII.

TABLE VII

|  | With Ni | |
| --- | --- | --- |
|  | Intercalated in graphite, percent | Deposited on charcoal, percent |
| Propylene | 99.3 | 98.6 |
| Propyne | N.D. | N.D. |
| Propane | 0.7 | 1.7 |

Observations: The intercalation decreases the reduction to the alkane.

EXAMPLE 8

A mixture of ethylene (85%), acetylene (5%) and hydrogen (10%) was treated using the procedure described in Example 6. The catalyst was 0.5% Ni intercalated in graphite (3.502 g. of catalyst containing 17.5 mg. of Ni). At a pressure of 59 p.s.i., a temperature of 320° C. and a flow rate of 990 cc./min. (20,000 VgVc$^{-1}$ hr.$^{-1}$), the resulting mixture contained no acetylene, 0.9% of ethane and 99.1% of ethylene.

I claim:
1. A process which comprises hydrogenating a mixture of an alkene and a member selected from alkynes and conjugated dienes, the hydrogenation step being carried out in the presence of a transition metal catalyst intercalated in graphite wherein the transition metal is in the metallic state having a zero valence and is selected from nickel, palladium and platinum, whereby the alkynes or conjugated dienes are substantially selectively reduced to the corresponding alkenes without undue reduction of alkene to alkane.
2. The process of claim 1, wherein the amount of alkene in the starting mixture is at least 80%.
3. The process of claim 1, wherein the concentration of the transition metal intercalated in graphite is in the range of from 0.01 to 30% by weight.
4. The process of claim 1, wherein the transition metal is nickel.
5. The process of claim 1, wherein the transition metal is palladium.
6. The process of claim 1, wherein the transition metal is platinum.

References Cited
UNITED STATES PATENTS

| 2,101,104 | 12/1937 | Smith et al. | 260—667 |
| 2,749,359 | 6/1956 | Calkins et al. | 260—667 |
| 2,802,889 | 8/1957 | Frevel et al. | 260—677 H |
| 2,846,479 | 8/1958 | Saunders et al. | 260—667 |
| 2,981,769 | 4/1961 | Frevel et al. | 260—677 H |
| 3,075,024 | 1/1963 | Frevel et al. | 260—677 H |
| 3,075,917 | 1/1963 | Kronig et al. | 260—677 H |
| 3,127,452 | 3/1964 | Codignola | 260—667 |
| 3,489,809 | 1/1970 | Keith et al. | 260—677 H |

DELBERT E. GANTZ, Primary Examiner

V. O'KEEFE, Assistant Examiner

U.S. Cl. X.R.

260—666 A, 667, 683.9; 252—447